United States Patent
Sparago et al.

(10) Patent No.: US 7,350,185 B2
(45) Date of Patent: Mar. 25, 2008

(54) SYSTEM, METHOD, AND COMPUTER PROGRAM PRODUCT FOR EFFORT ESTIMATION

(75) Inventors: Evan S. Sparago, Troy, MI (US); Mark E. Gragg, Grand Blanc, MI (US); William J. Stamp, Royal Oak, MI (US)

(73) Assignee: Electronic Data Systems Corporation, Plano, TX (US)

( * ) Notice: Subject to any disclaimer, the term of this patent is extended or adjusted under 35 U.S.C. 154(b) by 424 days.

(21) Appl. No.: 10/654,633

(22) Filed: Sep. 3, 2003

(65) Prior Publication Data

US 2005/0050551 A1 Mar. 3, 2005

(51) Int. Cl.
*G06F 9/44* (2006.01)
(52) U.S. Cl. .............. 717/101; 705/9; 705/8; 705/7; 706/21; 706/48
(58) Field of Classification Search ........... 717/101; 705/34, 1, 7–9, 11; 706/21, 30, 48
See application file for complete search history.

(56) References Cited

U.S. PATENT DOCUMENTS

| | | | | |
|---|---|---|---|---|
| 4,751,635 A | * | 6/1988 | Kret | 707/10 |
| 5,233,513 A | * | 8/1993 | Doyle | 705/7 |
| 5,629,770 A | * | 5/1997 | Brassil et al. | 358/426.12 |
| 5,675,802 A | * | 10/1997 | Allen et al. | 717/103 |
| 5,724,504 A | * | 3/1998 | Aharon et al. | 714/33 |
| 5,729,746 A | * | 3/1998 | Leonard | 717/101 |
| 5,754,760 A | * | 5/1998 | Warfield | 714/38 |
| 5,758,061 A | * | 5/1998 | Plum | 714/35 |
| 5,805,795 A | * | 9/1998 | Whitten | 714/38 |
| 5,809,304 A | * | 9/1998 | Yuki | 717/101 |
| 5,913,198 A | * | 6/1999 | Banks | 705/36 R |
| 5,930,798 A | * | 7/1999 | Lawler et al. | 707/102 |
| 6,014,760 A | * | 1/2000 | Silva et al. | 714/46 |
| 6,067,639 A | * | 5/2000 | Rodrigues et al. | 717/38 |
| 6,088,659 A | * | 7/2000 | Kelley et al. | 702/62 |
| 6,128,773 A | * | 10/2000 | Snider | 717/132 |
| 6,182,273 B1 | * | 1/2001 | Tarumi | 717/101 |
| 6,260,020 B1 | * | 7/2001 | Ruffin et al. | 705/1 |
| 6,279,124 B1 | * | 8/2001 | Brouwer et al. | 714/38 |
| 6,286,005 B1 | * | 9/2001 | Cannon | 707/100 |
| 6,314,555 B1 | * | 11/2001 | Ndumu et al. | 717/101 |
| 6,343,285 B1 | * | 1/2002 | Tanaka et al. | 705/400 |
| 6,405,364 B1 | * | 6/2002 | Bowman-Amuah | 717/101 |
| 6,408,403 B1 | * | 6/2002 | Rodrigues et al. | 714/38 |
| 6,438,743 B1 | * | 8/2002 | Boehm et al. | 717/122 |
| 6,502,102 B1 | * | 12/2002 | Haswell et al. | 707/102 |
| 6,513,154 B1 | | 1/2003 | Porterfield | |
| 6,519,763 B1 | * | 2/2003 | Kaufer et al. | 717/101 |

(Continued)

OTHER PUBLICATIONS

"Software Engineering" 6th Edition, Addison Wesley Ian Sommerville, 2000, pp. 511-533.*

(Continued)

*Primary Examiner*—Todd Ingberg
(74) *Attorney, Agent, or Firm*—Munck Butrus Carter, P.C.

(57) ABSTRACT

A system and method for establishing an estimate for proposals and other customer requests which precludes an extensive up front investment in expert opinion and design. This is accomplished by applying a pattern-based technique toward rough application effort sizing called herein "Web Based Macro Patterns."

21 Claims, 4 Drawing Sheets

U.S. PATENT DOCUMENTS

| | | | |
|---|---|---|---|
| 6,546,506 B1* | 4/2003 | Lewis | 714/38 |
| 6,550,057 B1* | 4/2003 | Bowman-Amuah | 717/126 |
| 6,601,233 B1* | 7/2003 | Underwood | 717/102 |
| 6,636,585 B2* | 10/2003 | Salzberg et al. | 379/22 |
| 6,658,643 B1* | 12/2003 | Bera | 717/101 |
| 6,662,357 B1* | 12/2003 | Bowman-Amuah | 717/120 |
| 6,675,149 B1 | 1/2004 | Ruffin et al. | |
| 6,701,514 B1* | 3/2004 | Haswell et al. | 717/115 |
| 6,715,130 B1* | 3/2004 | Eiche et al. | 715/514 |
| 6,718,535 B1* | 4/2004 | Underwood | 717/101 |
| 6,725,399 B1* | 4/2004 | Bowman | 714/38 |
| 6,745,384 B1* | 6/2004 | Biggerstaff | 717/156 |
| 6,772,083 B2* | 8/2004 | Muller et al. | 702/123 |
| 6,775,680 B2* | 8/2004 | Ehrman et al. | 707/102 |
| 6,775,824 B1* | 8/2004 | Osborne et al. | 717/125 |
| 6,785,805 B1* | 8/2004 | House et al. | 713/1 |
| 6,859,768 B1* | 2/2005 | Wakelam et al. | 703/1 |
| 6,907,546 B1* | 6/2005 | Haswell et al. | 714/38 |
| 6,944,606 B2* | 9/2005 | Schmit et al. | 706/60 |
| 6,959,433 B1* | 10/2005 | Morales et al. | 717/127 |
| 6,970,803 B1* | 11/2005 | Aerdts et al. | 702/179 |
| 6,978,446 B2* | 12/2005 | Archambeault et al. | 717/132 |
| 6,996,811 B2* | 2/2006 | Nishioka et al. | 717/135 |
| 7,000,224 B1* | 2/2006 | Osborne et al. | 717/125 |
| 7,013,285 B1* | 3/2006 | Rebane | 705/10 |
| 7,024,589 B2* | 4/2006 | Hartman et al. | 714/32 |

OTHER PUBLICATIONS

"Software Requirements", Microsoft Press, Karl E. Wiegers, 1999, pp. 258-259.*

"On Time Within Budget Software Project Management Practices and Techniques", E.M. Bennatan, 1992, pp. 1-43, 162-195.*

COCOMO II Model Definition Manual, Barry Boehm et al, 1998, Whole Manual.*

Software Project Cost & Schedule Estimating Best Practicce, William H Roetzheim et al, pp. 1-186, 1997.*

Productive Objects An Applied Software Project Management Framework, Robert J. Muller, Aug. 1, 1997, Chapters 37-43.*

Software Engineering Economics, Barry W. Boehm, 1981, pp. 35-55,532-555.*

* cited by examiner

Figure 1

PRIOR ART

Figure 2

PRIOR ART

SYSTEM, METHOD, AND COMPUTER PROGRAM PRODUCT FOR EFFORT ESTIMATION

TECHNICAL FIELD OF THE INVENTION

The present invention is directed, in general, to project effort estimation.

BACKGROUND OF THE INVENTION

One of the most challenging problems associated with request-for-proposal (RFP) responses, or project startup, is effort estimation. Current techniques rely on either expert opinion (experience-based estimates), estimating per function point, or making a rough design and assuming an effort for each artifact in the design. A problem with these techniques is that very often, expert opinion is not available, either due to resource limitations or the fact that the proposed solution has simply never been attempted before (in requirements or scale). Anything other than a cursory or vague guess at the design of the proposed solution requires both massive amounts of up front design effort (probably without funding and lack of time during an RFP response), and a presumption that representative metrics already exist for each artifact in the design.

With these challenges in place, estimates are often highly inaccurate, which results in improper solution sizing, incorrect solution responses, difficult project startup, or cost overruns.

There is, therefore, a need in the art for a system, method, and computer program product for effort estimation.

SUMMARY OF THE INVENTION

To address the above-discussed deficiencies of the prior art, it is an object of the present invention to provide an improved system and method for effort estimation.

The preferred embodiment provides a system and method for establishing an estimate for proposals and other customer requests which precludes an extensive up front investment in expert opinion and design. This is accomplished by applying a pattern-based technique toward rough application effort sizing called herein "Web Based Macro Patterns."

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device. The numerous innovative teachings of the present application will be described with particular reference to the presently preferred embodiment.

The preferred embodiment provides a system and method for establishing an estimate for proposals and other customer requests which precludes an extensive up front investment in expert opinion and design. This is accomplished by applying a pattern-based technique toward rough application effort sizing called herein "Web Based Macro Patterns."

Figure 1:
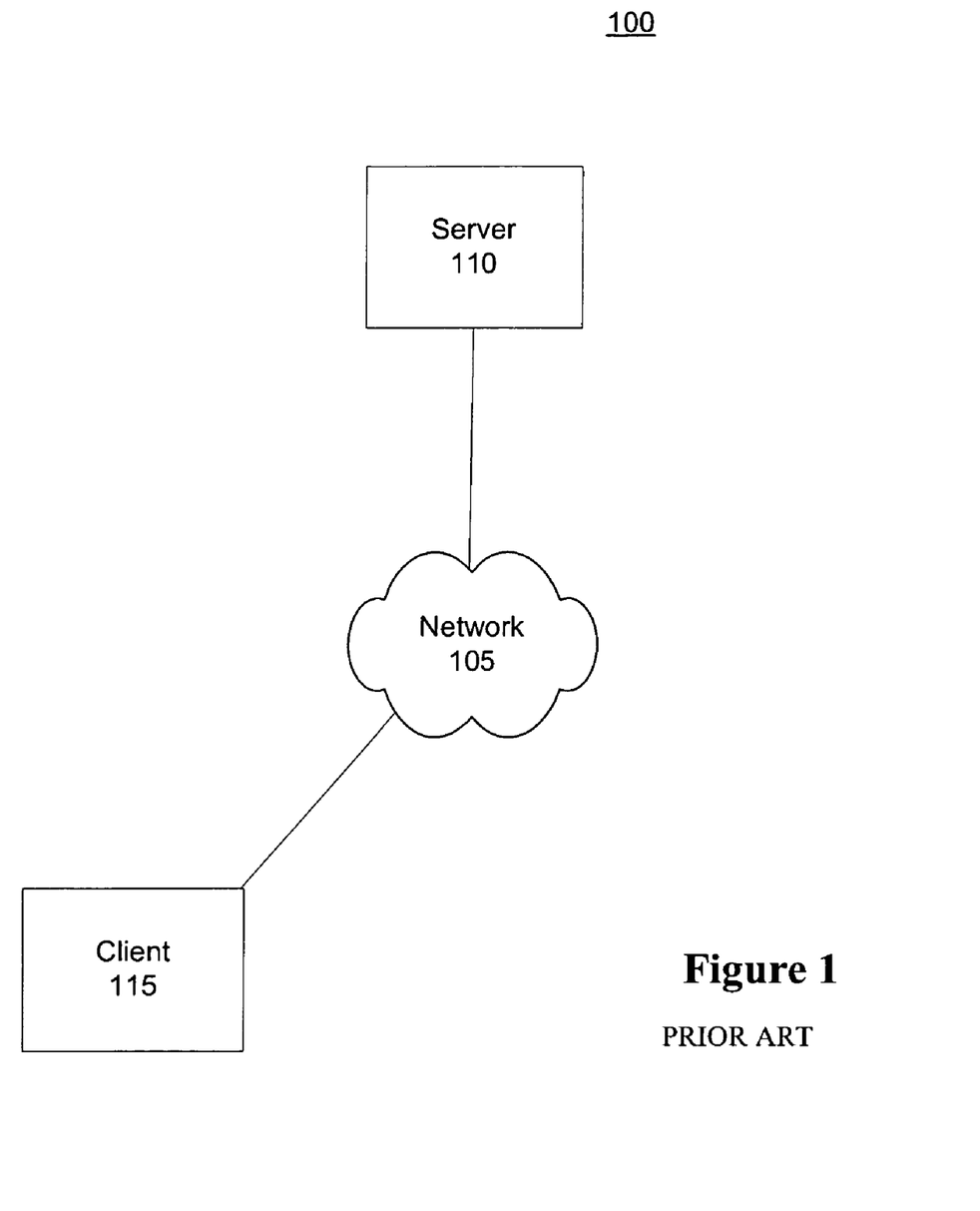
FIG. 1 depicts a block diagram of a data processing system in which a preferred embodiment can be implemented.

FIG. 1 depicts a block diagram of a data processing system in which a preferred embodiment can be implemented. Network system 100 can be implemented in any type of public or private computer network, and can be implemented by data processing systems connected by telephone line, a local-area-network, a wide-area-network, by Ethernet, fiber optic cable, or any other known means.

Server 110 is connected to network system 105, and can thereby communicate with client system 115.

Typically, a user will use client system 115 to access a servlet and data on server 110. The user will typically use a thin-client browser on client system 115 to access server 110. It should be noted that typically many other data processing systems will be connected to network system 105, including multiple client systems and multiple server systems.

Figure 2:
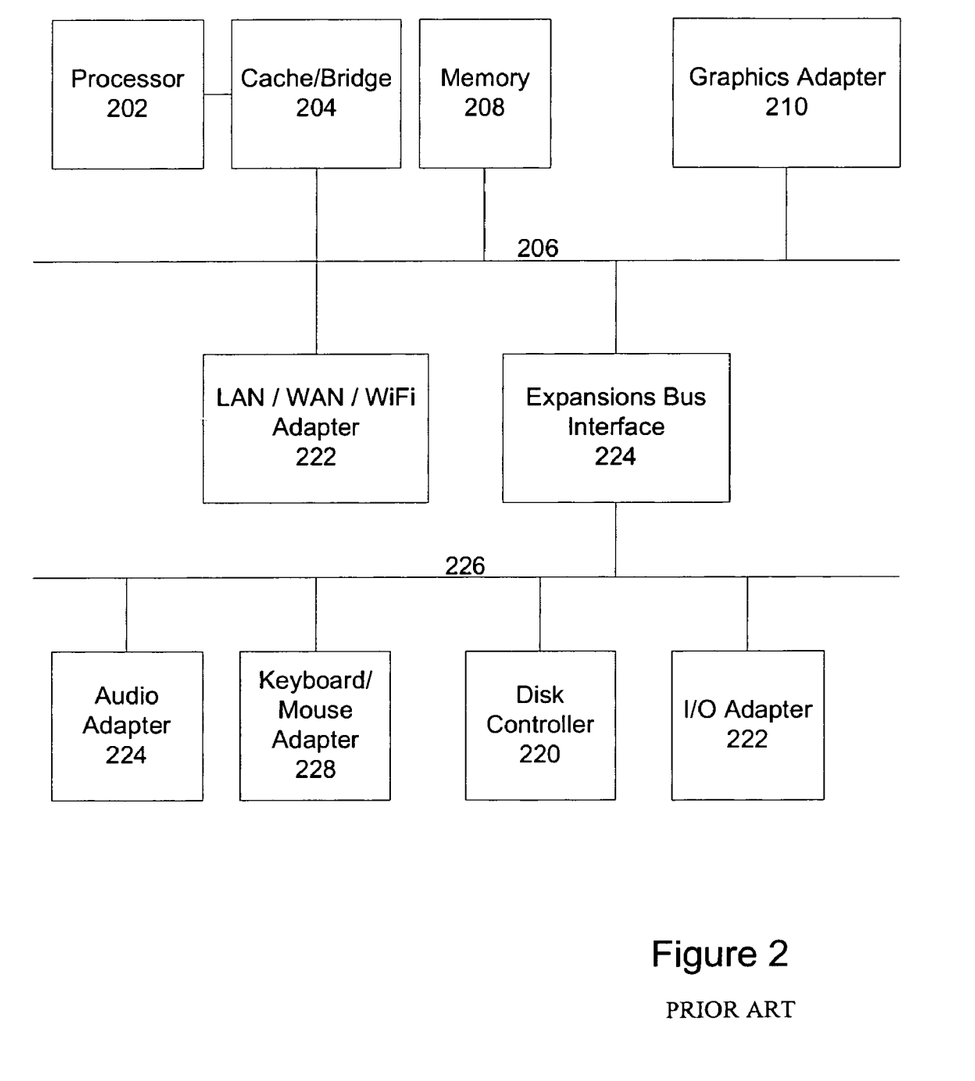
FIG. 2 depicts a data processing system in which a preferred embodiment of the present invention may be implemented, as any of the disclosed data processing systems.

FIG. 2 depicts a data processing system in which a preferred embodiment of the present invention may be implemented, as any of the disclosed data processing systems. The data processing system depicted includes a processor 202 connected to a level two cache/bridge 204, which is connected in turn to a local system bus 206. Local system bus 206 may be, for example, a peripheral component interconnect (PCI) architecture bus. Also connected to local system bus in the depicted example are a main memory 208 and a graphics adapter 210.

Other peripherals, such as local area network (LAN)/Wide Area Network/Wireless (e.g. WiFi) adapter 212, may also be connected to local system bus 206. Expansion bus interface 214 connects local system bus 206 to input/output (I/O) bus 216. I/O bus 416 is connected to keyboard/mouse adapter 218, disk controller 220, and I/O adapter 222.

Also connected to I/O bus 216 in the example shown is audio adapter 224, to which speakers (not shown) may be connected for playing sounds. Keyboard/mouse adapter 418 provides a connection for a pointing device (not shown), such as a mouse, trackball, trackpointer, etc.

Those of ordinary skill in the art will appreciate that the hardware depicted in FIG. 2 may vary for particular. For example, other peripheral devices, such as an optical disk drive and the like, also may be used in addition or in place of the hardware depicted. The depicted example is provided for the purpose of explanation only and is not meant to imply architectural limitations with respect to the present invention.

A data processing system in accordance with a preferred embodiment of the present invention includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present invention as described. Further, a spreadsheet application such as Microsoft Excel™ can be used to implement certain aspects of the present invention.

A preferred embodiment is implemented using Sun Microsystems' JAVA 2 Enterprise Edition (J2EE). The J2EE Layers used herein include:

Presentation—The actual UI parts of the application.

Application—Application Layer binds an application together by providing the glue and the workflow between components on the presentation layer and the service layer. In general this layer is responsible for managing client side state (HTTP Session), performing syntactic validation on the client input, and delegating to the services layer for business logic. This layer can consider tag libraries, if they make calls to the Service Layer.

Service—Session Bean is the main entry point, and serves as the Layer that the Application Layer calls to invoke business logic specific to particular Use Cases. Services Layer is usually implemented with the Session Façade Pattern. Main function of the Service Layer is to provide ways to invoke the business logic of Use Case (on a Domain Object), controlling the transaction that the Use Cases run under and handling any delegation and workflow between Domain objects required to fulfill a Use Case. A key distinction here is that multiple application layers can access the same services layer, such as a web site and a thick client both accessing the same session bean layer.

Domain—The Domain Layer (for example Entity Bean) is where all the objects that came out of an object oriented analysis of the business problem (the domain model) reside. The services layer delegates many of the requests it receives to the domain layer. Thus the domain layer is where the business problem resides and is often application independent (reusable across application/project).

Persistence (Persistence storage of domain object state)—Persistence Layer contains all of the plumbing logic required to make the domain logic persist in a data store. For CMP entity beans, JDO, and O/R, external tools are used to map domain objects to the data store. For BMP entity beans, and session beans this layer can be implemented with the data access command bean pattern.

J2EE Stereotypes: All artifacts created for J2EE architectures can be categorized into generic terms. These terms are called "stereotypes". For example, a JAVA class can be thought of as a stereotype. Each of the J2EE Layers described above contain many stereotypes. In some cases, stereotypes exist in multiple layers. Each layer and the associated stereotypes relevant to this patent are presented in the table below:

| J2EE Architecture Layer name | Stereotype(s) included in Layer |
| --- | --- |
| Static Web Presentation | DTD, HTML, Images, JAVASCRIPT JSPs Tags |
| Application | Process Runner (Controller Servlet) Action Navigation Process Dispatcher Process Object (Display and Process Components) Business Delegate Properties files Web Deployment Descriptors |
| Service | Session Facade Bean Session Facade Service Session Bean, Session Bean Service Custom DTO EJB Deployment Descriptors |
| Domain | DataAccessService Datamap Domain DTO POJO's Entity Bean |
| Persistence | Database Flat Files |

It is generally difficult to model J2EE architectures by describing each stereotype. It is much more convenient to use collections of stereotypes that are already modeled according to best practices, and commonly used in the industry. These collections are called "J2EE Patterns". By finding the appropriate pattern (assuming one exists), and using it to address business and/or architecture requirements, designs can be leveraged and best practices reused. The patterns most relevant to the discussions here are:

View Helper in the form of Tags—encapsulates logic that is not related to presentation formatting into Helper components)

Composite View—creates an aggregate View from atomic subcomponents)

Service To Worker—combines a Dispatcher component with the Front Controller and View Helper Patterns)

Business Delegate—decouples presentation and service tiers, and provides a façade and proxy interface to the services)

Value Object in the form of Custom and Domain Data Transfer Objects—facilitates data exchange between tiers by reducing network chattiness)

Session Facade—hides business object complexity; centralizes workflow handling)

Data Accessor—encapsulates data access and assembly of Value Object)

A Web Based Macro Pattern is the collection of J2EE Patterns that meets the requirements of the most typical Use Cases in a Web Based solution. "Web Based" is understood to include a browser-based client which is able to access Servlets.

Web Based Macros extend along, and between, each of the J2EE Layers, and contain many of the J2EE Patterns and Stereotypes that are referenced in the Background Section above. Some of the most useful Web Based Macro Patterns are:

Display Data to User—in this Macro Pattern, the user initiates a request to view information in an organized manner;

Process Action—in this Macro Pattern, the user initiates a request that results in a modification of data on the persistence layer; and Process Action followed by Display Data—this is a combination of the 2 Macro Patterns. A collection of Macro Patterns is referred to herein as "Macro Pattern Chaining". In this scenario, the Use Case allows the user to modify data, and then receive some confirmation page detailing what was modified.

Figure 3:
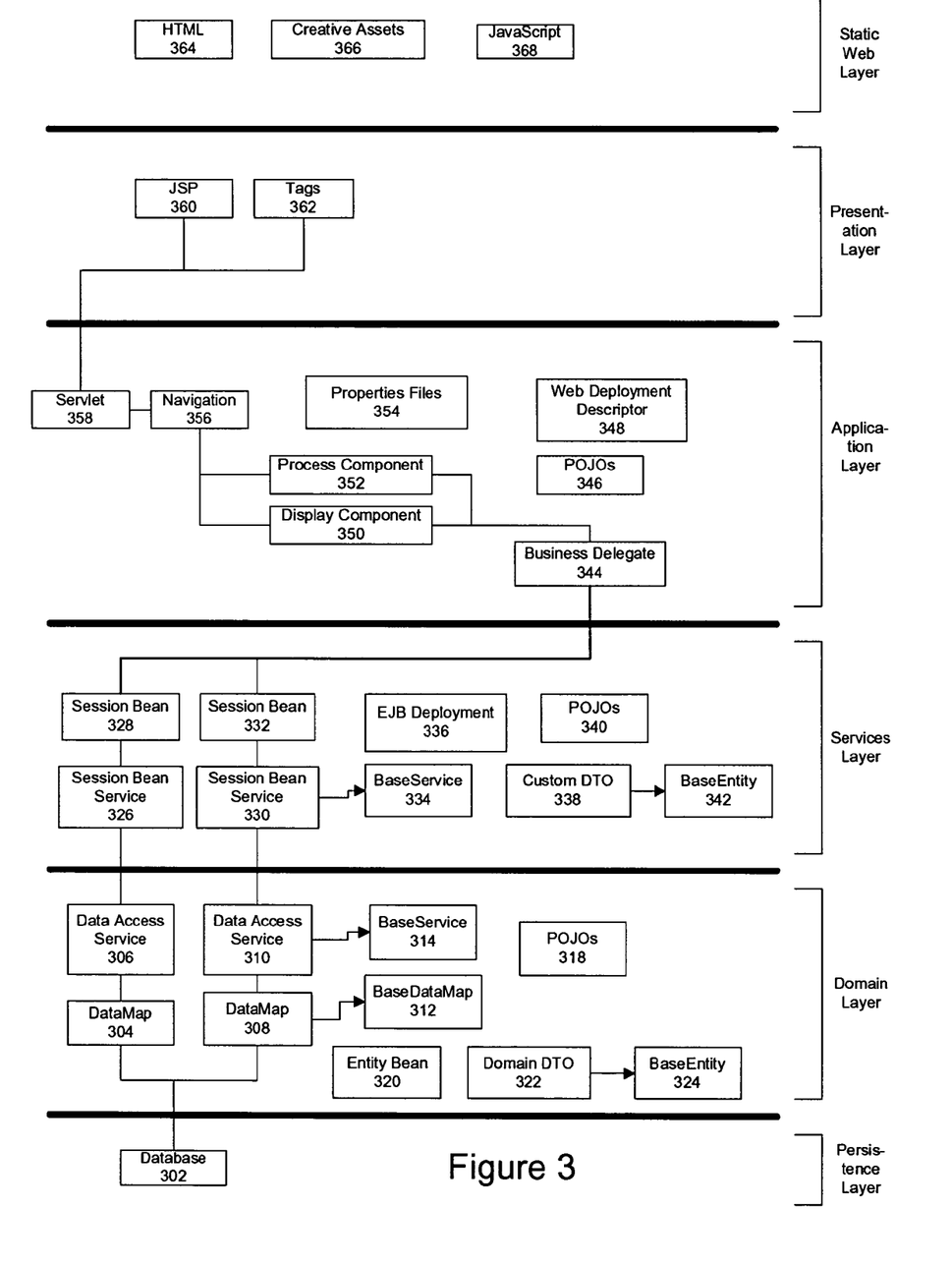
FIG. 3 depicts a block diagram of web-based macro patterns in accordance with a preferred embodiment.

These few Macro Patterns can be used to fulfill the vast majority of Use Cases observed in Web Based Applications. FIG. 3 depicts a block diagram of web-based macro patterns in accordance with a preferred embodiment. Here, the persistence layer includes database 302. The domain layer includes datamaps 304 and 308, data access services 306 and 310, base service 314, base data map 312, POJO(s) 318, entity bean 320, domain DTO 322, and base entity 324.

The service layer includes session bean services 326 and 330, session beans 328 and 332, base service 334, EJB deployment 336, custom DTO 338, POJO(s) 340, and base entity 342.

The application layer includes business delegate 344, display component 350, process component 352, property files 354, POJO(s) 346, web deployment descriptor 348, navigation 356, and servlet 358.

The presentation layer includes JSO 360 and tags 362. The static web layer includes HTML 364, creative assets 366, and Javascript 368.

In this figure, the display data macro pattern includes datamap 308, data access service 310, session bean service 330, session bean 332, display component 350, and JSP 360.

Further, the process action macro pattern includes datamap 304, data access service 306, session bean service 326, session bean 328, and process component 352.

The remaining blocks can be used by any macro pattern.

J2EE Layers: J2EE Layers are described by Floyd Marinescu in the book "EJB Design Patterns," which is hereby incorporated by reference. Generally speaking, a layer represents a logical collection of like-purposed stereotypes associated with an Application Function Responsibility. These layers, their Application Function Responsibilities and their associated stereotypes are presented in the table below. Also presented is the physical deployment onto which each layer is deployed.

| J2EE Architecture Layer | Application Function Responsibility | Stereotype | Infrastructure Deployment Server |
|---|---|---|---|
| *Static Web | MW/BAS created layer | DTD HTML Images JavaScript Flash | Web Server |
| Presentation | User interface. The actual UI parts of the application. | JSPs Tag Libraries | Application Server |
| Application | Application Layer binds an application together by providing the glue and the workflow between components on the presentation layer and the service layer. In general this layer is responsible for managing client side state (HTTP Session), performing syntactic validation on the client input, and delegating to the services layer for business logic. This layer can consider tag libraries, if they make calls to the Service Layer. | Process Runner (Controller Servlet) Action Navigation Process Dispatcher Process Object (Display and Process Components) Business Delegate Properties files Web Deployment Descriptors | Application Server |

-continued

| J2EE Architecture Layer | Application Function Responsibility | Stereotype | Infrastructure Deployment Server |
|---|---|---|---|
| Service | Session Bean is the main entry point in the EJB side of things, and serves as the Layer that the Application Layer calls to invoke business logic specific to particular Use Cases. Services Layer is usually implemented with the Session Facade Pattern. Main function of the Service Layer is to provide ways to invoke the business logic of Use Case (on a Domain Object), controlling the transaction that the Use Cases run under and handling any delegation and workflow between Domain objects required to fulfill a Use Case. A key distinction here is that multiple application layers can access the same services layer, such as a web site and a thick client both accessing the same session bean layer. | Session Bean Session Bean Service Custom DTO EJB Deployment Descriptors | Application Server |
| Domain | The Domain Layer (for example Entity Bean) is where all the objects that came out of an object-oriented analysis of the business problem (the domain model) reside. The services layer delegates many of the requests it receives to the domain layer (Fowler and Mee, 2001). Thus the domain layer is definitely where the meat of the business problem resides and is often application independent (reusable across application/ project). | DataAccessService Datamap Domain DTO POJO's Entity Bean | Application Server |
| Persistence | Persistence Layer contains all of the plumbing logic required to make your domain logic persist in a data store. For CMP entity beans, JDO, and O/R the developer does not need to do any coding for this layer. Rather the external tools are used to map domain objects to the data store. For BMP entity beans, and session beans this layer can be implemented with the data access command bean pattern. | Database Flat Files | EIS Server |

J2EE Patterns: It is difficult to model J2EE architectures by describing each stereotype. It is much more convenient, to use collections of stereotypes that are already modeled according to best practices, and commonly used in the industry. These collections in the J2EE community are called "J2EE Patterns". By finding the appropriate pattern (assuming one exists), and using it to address business and/or architecture requirements, designs can be leveraged and best practices reused. The patterns most relevant to the preferred embodiments are:

View Helper in the form of Tags—encapsulates logic that is not related to presentation formatting into Helper components)
   Composite View—creates an aggregate View from atomic subcomponents)
   Service To Worker—combines a Dispatcher component with the Front Controller and View Helper Patterns)
   Business Delegate—decouples presentation and service tiers, and provides a facade and proxy interface to the services)
   Value Object in the form of Custom and Domain Data Transfer Objects—facilitates data exchange between tiers by reducing network chattiness)
   Session Façcde—hides business object complexity; centralizes workflow handling)
   Data Accessor—encapsulates data access and assembly of Value Object)

Bean and SessionBean Service classes: SessionBeanService class implements business methods published on the bean. The preferred embodiment uses a matching SessionBeanService class. SessionBeanService class is directly accessed when beans are not implemented. SessionBeanService class uses datamap and other service classes, and constructs CustomDTOs as part of non-presentation customization of logic.

DataAccessService: DataAccessService can use many DataMap classes, constructs DomainDTOs, and returns business objects from Datamap.

Following is a table of definitions of some terms used herein:

| Term | Definition |
|---|---|
| Action | STRUTS implementation of Process Component (see Process Component) |
| Application Layer | J2EE Architecture layer containing Use-Case UI workflow, syntactic validation, interaction with services |
| Application Server | J2EE container managing the Servlet, EJB and JSP specifications |

-continued

| Term | Definition |
| --- | --- |
| config.xml | Struts implementation of PropertiesFiles UserActions file |
| CustomDTO | A Data Transfer Object that is customized for a specific display. May contain customized data from multiple Domain DTO's. Used to transfer data from the Service Layer to the Application Layer. |
| DataAccessService | JAVA class that fronts the Datamap. Contains domain data behavior. Constructs the DomainDTO, and passes to the Datamap. Contains domain behavior, and conditionally modifies the DomainDTO. Returns the DomainDTO to the Service Layer |
| Datamap | JAVA class with methods built around database access. Uses SQL and JDBC to communicate with database. Converts record sets to Domain Data Transfer Objects. |
| Domain Layer | The domain model, domain/business logic, semantic validation |
| DomainDTO | A Data Transfer Object that contains domain data. Used to transfer the data from the Domain Layer to the Service Layer. |
| DTD | Document Type Definition. Used to validate and check the well-formedness of the XML |
| EIS Server | Enterprise Information Server. Examples of this could be: RDBMS, or a flat file. Anything that can maintain persistence of data. |
| EJB | Enterprise JAVA Bean. Used to refer to both Entity Beans and Session Beans (stateless/stateful). |
| EJB Deployment Descriptor | XML file that contains deployment information for the EJB's. Used by Application Server to understand how to deploy the EJB's |
| Entity Bean | Type of EJB. Represents specific Table/Row information. Container manages persistence and refreshes data when table changes (CMP), or the bean itself can manage it's own persistence (BMP). |
| Framework | Collection of reusable objects that fulfill common architectural and Pattern based demands. Used as an alternative to starting "from scratch". In BAS, the framework we use is FAS, and sometimes STRUTS. |
| J2EE | JAVA 2 Platform, Enterprise Edition |
| JSP | JAVA Server Pages |
| Junit | JAVA classes that follow specific implementation, used for automated testing of components in various layers. |
| Layer | Logical architectural classification. All Web stereotypes belong to one or more layers. |
| Macro Pattern | Collection of those Web Patterns which address typical Web Use Cases (CRUD) |
| Pattern | Organization of implementation that follows established best practices |
| Persistence | Retains data between sessions |
| Persistence Layer | Persistence storage of domain object state |
| POJO(s) | Plain Old JAVA Object(s) |
| Presentation Layer | User interface |
| Process Chain | Assembling two or more Macro Patterns to fulfill complicated Use Case |
| Process Component | JAVA class that owns fulfillment of Use Case. First modifiable class called by the framework. |
| PropertiesFiles | Contains environment specific information. Alternative to hard coding. These are usually modified during promotion process |
| Service Layer | Controlling transactions, business/workflow logic, acting as facade |
| Servlet | JAVA's implementation of CGI-BIN. Allows browser to initiate JAVA class on application server to fulfill user request. |
| Session Bean | Type of EJB. Can be both Stateless and Statefull. Used as a mechanism to distribute application between application servers, and as a way to handle Transactions. |
| Session Bean Service | Helps the Session Bean. Contains the implementation of all the methods found in the Session Bean. Located in the Service Layer |
| Stereotype | Classification of artifact. Most of the items in this Dictionary can be thought of as a stereotype. |
| Tags | JAVA methods that help the JSP render the presentation. |
| UML | Unified Modeling Language. Used by object modelers to design object pool. Contains inheritance and other useful design information. |
| Web Deployment Descriptor | XML file that contains deployment information for the Web parts of the overall application. Used by Application Server to understand application |

-continued

| Term | Definition |
| --- | --- |
| Web Server | Establishes HTTP protocol and forwards browser request to Application Server. Contains creative assets and provides mechanism to cache frequently used assets. |
| XML | Extensible Markup Language. Used for object communication, rendering and deployment descriptors. |
| XSL | Extensible Style Language. Used with XML as an alternative to JSP's in the Presentation Layer. |

The first step in project effort estimating is an understanding of the business requirements. The next step is to model the Use Cases. In fast estimating environments, like informal customer requests or high level responses to RFP's, the Use Cases are generally quickly derived by the advanced team. In more formal estimating environments, such as true project startup, the Use Cases are derived after a detailed investigation by the team Modelers.

In either case, the use cases have a direct mapping to the Macro Patterns. The vast majority of Use Case that involve the user will contain either a users request to view data or a users request to modify data.

It is now only a matter of interrogating the Use Cases to determine how many times a Macro Pattern is used. For example, if there are 3 Use Cases where the user simply views reports, then the "Display Data To User" Macro Pattern would be used three times. In this case, the reuse provides an opportunity to apply a reusability factor to the estimating metrics.

Obviously, knowledge of the type, and number of Macro Patters required by the set of Use Cases is not enough. Knowledge of how much effort each Macro Pattern requires is essential. For Macro Patterns to work, an organization must have metrics that track those organizations actual effort hours in historically completing a Macro Pattern. However, as these Macro Patterns apply to Use Cases, the resource effort against completion of Use Cases is generally known by a CMM Level 3 (or above) organization as part of its Metrics Collection activity.

Therefore, the building blocks for estimation are already available. Some socialization of metrics tracking according to Use Cases might have to occur, and the evolution of those metrics as organizations become better is necessary. Issues such as reusability factors are also important and must be determined by the organization. However, the metrics are usually available in a form readily applicable to this estimating technique.

Figure 4:
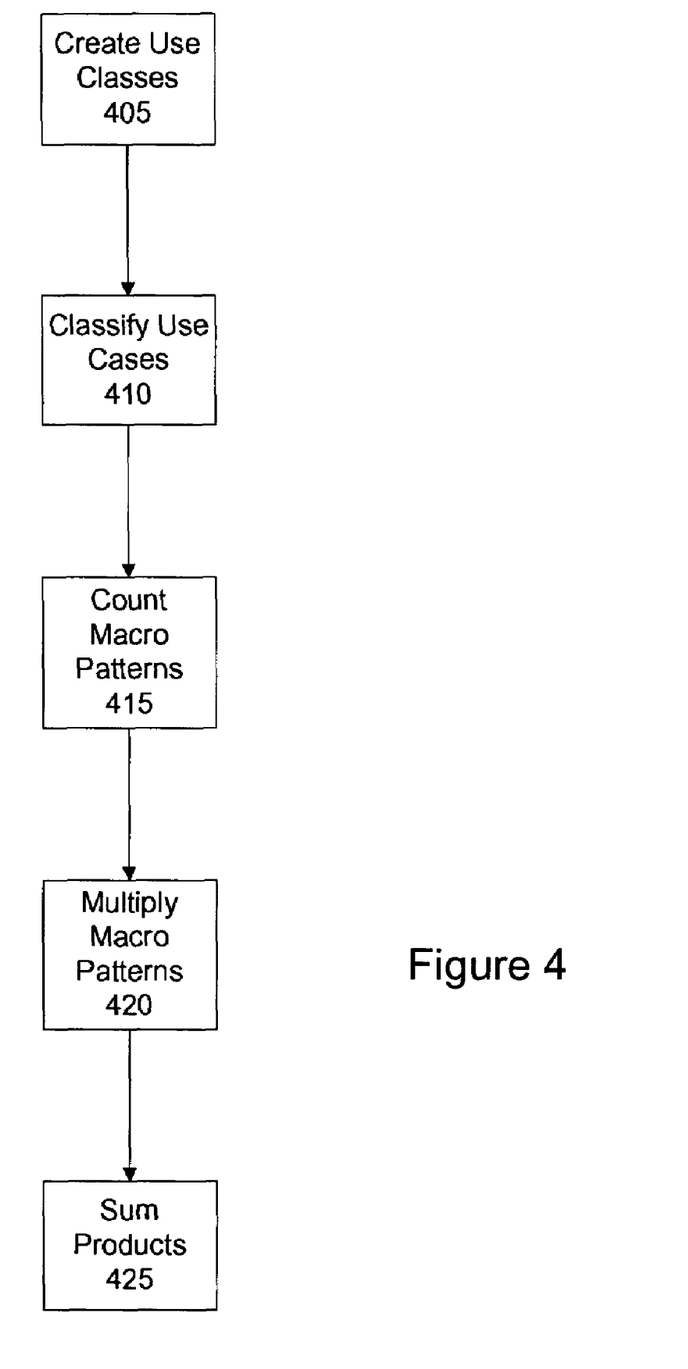
FIG. 4 depicts a flowchart of a process in accordance with the preferred embodiment.

FIG. 4 depicts a flowchart of a process to collect metrics. First, the business requirements are used to create Use Cases (step 405).

Next, the Use Cases are classified according to a predetermined set of Macro Patterns (step 410).

Next, the system will count how many times each Macro Pattern is applied (step 415).

Next, the metric for each Macro Pattern is multiplied by the number of times it is applied (step 420), and the resulting products are summed (step 425). This sum represents the development and unit testing estimate for the business requirements. Note that it may be appropriate to apply a reusability factor for similar functionality.

Note that this estimate is only intended to provide effort for the produce and unit testing aspects, that typically account for only roughly 26% of the overall effort in any application delivery. Other areas such as: requirements gathering, full design, project management and testing still need to be added via some other technique to the estimate provided by this procedure.

In practice, the user will also preferably keep track of the actual effort hours so that pattern metrics can be continuously updated in order to give more accurate estimates.

The preferred embodiments improve on conventional techniques in several ways, including:

Macro patterns: No known method includes the approach of assembling patterns based on use cases during the estimating phase is unknown to this author anywhere else.

Experience-Based Estimation during Sales Cycle: Most projects are estimated at a high level using either functions or atomic level components as a basis for effort. Since expert opinion is rarely available, and time is critical, these efforts are usually highly inaccurate. The use of the preferred embodiment results in a faster, more consistent and more accurate estimate during the sales cycle.

Communication: With minimal training, the methodology can provide for consistent, accurate, and straightforward estimates.

Reuse: A reuse factor can be used in those situations where several use cases sharing a common macro pattern is able to leverage the same or similar code. This allows for an improved estimate that takes into account leveragability.

The techniques of the preferred embodiment can be applied to almost any element of a Web Based Solution. Once the core set of patterns, along with their associated metrics are constructed and stored in knowledge repositories, resources can quickly learn about best practices and leverage the collective knowledge of an organization.

This consistent approach to effort estimating means that when the estimates are re-assembled into the solution handed to the customer, there can be higher confidence in knowing that all shores approached the estimate in the same manner and that this manner can be quickly explained to the customer during negotiations.

Another benefit of a system and method according to the preferred embodiments is the continuity of design between estimator and system designer. Historically, an estimator will construct a view of the system that does not reflect the view taken by the designer. Again, this is often related to the fact that there is neither the time, nor the expertise to create a significantly accurate design during the estimating cycle. This disconnect means that many stereotypes assumed by the estimator, will, in fact, never even be considered by the designer which, in turn, quickly invalidates the estimate.

However, if all parties understand and apply the Macro Patterns appropriately, then a Macro Pattern (and constituent stereotypes) assumed by the estimator, will be relevant to the designer. This closer coupling has the happy effect of keeping the estimate grounded in the reality of the design.

Of course, while the preferred embodiments described above use the JAVA language and J2EE for implementation, those of skill in the art will recognize that these functions and processes can be implemented in any other suitable programming language, so long as the claimed functions and processes are performed.

Those skilled in the art will recognize that, for simplicity and clarity, the full structure and operation of all data processing systems suitable for use with the present invention is not being depicted or described herein. Instead, only so much of a data processing system as is unique to the present invention or necessary for an understanding of the present invention is depicted and described. The remainder of the construction and operation of data processing system 100 may conform to any of the various current implementations and practices known in the art.

It is important to note that while the present invention has been described in the context of a fully functional system, those skilled in the art will appreciate that at least portions of the mechanism of the present invention are capable of being distributed in the form of a instructions contained within a machine usable medium in any of a variety of forms, and that the present invention applies equally regardless of the particular type of instruction or signal bearing medium utilized to actually carry out the distribution. Examples of machine usable mediums include: nonvolatile, hard-coded type mediums such as read only memories (ROMs) or erasable, electrically programmable read only memories (EEPROMs), user-recordable type mediums such as floppy disks, hard disk drives and compact disk read only memories (CD-ROMs) or digital versatile disks (DVDs), and transmission type mediums such as digital and analog communication links.

Although an exemplary embodiment of the present invention has been described in detail, those skilled in the art will understand that various changes, substitutions, variations, and improvements of the invention disclosed herein may be made without departing from the spirit and scope of the invention in its broadest form.

For example, instead of collecting all the industry patterns into a single, larger "Macro Pattern" that can be mapped to a Use Case, industry patterns can be assembled into multiple larger patterns, which are then mapped to a Use Case.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC §112 unless the exact words "means for" are followed by a participle.

What is claimed is:

1. A method for effort estimation comprising:
creating at least one use case;
classifying each use case according to a set of macro patterns stored in a data processing system;
counting the number of times each macro pattern is applied;
multiplying the number of times each macro pattern is applied by a metric corresponding to that macro pattern, to produce a set of macro pattern products; and
summing the macro pattern products in a data processing system to determine an effort estimate, and storing the effort estimate in a data processing system database.

2. The method of claim 1, wherein the effort estimate represents a development and unit testing estimate.

3. The method of claim 1, wherein the use case includes a user request to view data.

4. The method of claim 1, wherein the use case includes a user request to modify data.

5. The method of claim 1, wherein the metric corresponding to a macro pattern reflect the effort hours required to complete the macro pattern.

6. The method of claim 1, wherein the method is implemented using a JAVA programming language.

7. The method of claim 1, further comprising receiving user input over a data processing system network.

8. A data processing system having at least a processor and accessible memory, comprising:
means for creating at least one use case;
means for classifying each use case according to a set of macro patterns;
means for counting the number of times each macro pattern is applied;
means for multiplying the number of times each macro pattern is applied by a metric corresponding to that macro pattern, to produce a set of macro pattern products; and
means for summing the macro pattern product to determine an effort estimate and storing the effort estimate in the memory.

9. The data processing system of claim 8, wherein the effort estimate represents a development and unit testing estimate.

10. The data processing system of claim 8, wherein the use case includes a user request to view data.

11. The data processing system of claim 8, wherein the use case includes a user request to modify data.

12. The data processing system of claim 8, wherein the metric corresponding to a macro pattern reflect the effort hours required to complete the macro pattern.

13. The data processing system of claim 8, wherein the data processing system interprets a JAVA programming language.

14. The data processing system of claim 8, further comprising means for receiving user input over a data processing system network.

15. A computer program product tangibly embodied in a computer-readable medium, comprising:
instructions for creating at least one use case;
instructions for classifying each use case according to a set of macro patterns;
instructions for counting the number of times each macro pattern is applied;
instructions for multiplying the number of times each macro pattern is applied by a metric corresponding to that macro pattern, to produce a set of macro pattern products; and
instructions for summing the macro pattern product to determine an effort estimate and storing the effort estimate in a data processing system database.

16. The computer program product of claim 15, wherein the effort estimate represents a development and unit testing estimate.

17. The computer program product of claim 15, wherein the use case includes a user request to view data.

18. The computer program product of claim 15, wherein the use case includes a user request to modify data.

19. The computer program product of claim 15, wherein the metric corresponding to a macro pattern reflect the effort hours required to complete the macro pattern.

20. The computer program product of claim 15, wherein the computer program product is stored in a JAVA programming language.

21. The computer program product of claim 15, further comprising instructions for receiving user input over a data processing system network.

* * * * *

UNITED STATES PATENT AND TRADEMARK OFFICE
CERTIFICATE OF CORRECTION

PATENT NO.       : 7,350,185 B2                                           Page 1 of 1
APPLICATION NO.  : 10/654633
DATED            : March 25, 2008
INVENTOR(S)      : Evan S. Sparago, Mark E. Gragg and William J. Stamp It is certified that error appears in the above-identified patent and that said Letters Patent is hereby corrected as shown below:

Title Page item 54 and Col. 1
In the Title, delete "SYSTEM, METHOD, AND COMPUTER PROGRAM PRODUCT FOR EFFORT ESTIMATION" and replace with --MACRO PATTERN EFFORT ESTIMATION--.

Signed and Sealed this

Twenty-fifth Day of November, 2008

JON W. DUDAS
*Director of the United States Patent and Trademark Office*